US006102410A

United States Patent [19]

Hotta

[11] Patent Number: 6,102,410
[45] Date of Patent: Aug. 15, 2000

[54] RUBBER STOPPER FOR WATERPROOF CONNECTOR

[75] Inventor: Tomoyuki Hotta, Shizuoka, Japan

[73] Assignee: Yazaki Corporation, Tokyo, Japan

[21] Appl. No.: 09/018,471

[22] Filed: Feb. 4, 1998

[30] Foreign Application Priority Data

Feb. 6, 1997 [JP] Japan .................................... 9-023956

[51] Int. Cl.[7] ........................................................ F16J 15/02

[52] U.S. Cl. .............................................................. 277/648

[58] Field of Search ..................................... 277/628, 644, 277/648; 215/355; 220/801, 804

[56] References Cited

U.S. PATENT DOCUMENTS 2,196,785 4/1940 Takiguchi .
2,577,780 12/1951 Lockhart .
3,006,494 10/1961 Reibeling .
3,578,027 5/1971 Zopfi .
4,238,048 12/1980 Elander .
4,420,076 12/1983 Beveridge et al. .
5,000,994 3/1991 Romberg et al. .
5,738,357 4/1998 Taylor et al. .

FOREIGN PATENT DOCUMENTS 2-7874 1/1990 Japan .

*Primary Examiner*—Anthony Knight
*Assistant Examiner*—John L. Beres
*Attorney, Agent, or Firm*—Morgan, Lewis & Bockius LLP

[57] ABSTRACT

An improved rubber stopper for a waterproof connector is very simple in structure, capable of ensuring that the terminal holding chamber of a connector housing is hermetically sealed and is prevented from coming out. A rubber stopper 10 for a waterproof connector is equipped with a columnar body portion 11 and a sealing protrusion 12 capable of adhering to the inside wall surface of a terminal receiving hole of a free cavity. The sealing protrusion 12 is equipped with an annular portion 13 which is protruded along the outer peripheral face of the body portion 11, and a thick-wall portion 14 which is thicker than the annular portion 13 in the axial direction. Each protrusion of the thick-wall portion 14 is equal in height to the annular portion 13 and has a substantially hemispherical shape smoothly continuous to the side face of the annular portion 13. The thick-wall portions 14 are protruded at equal intervals along the outer peripheral face of the annular portion 13.

5 Claims, 5 Drawing Sheets

RUBBER STOPPER FOR WATERPROOF CONNECTOR

BACKGROUND OF THE INVENTION

The present invention relates to a rubber stopper for a waterproof connector and more particularly to improvements in rubber stoppers for waterproof connectors, which rubber stopper is inserted into the terminal receiving hole of a connection-terminal holding chamber of a connector housing in order to hermetically seal the connection-terminal holding chamber in a liquid-tight fashion.

Heretofore, a typical conventional waterproof connector intended to prevent the penetration of water and the like from the outside has been so designed that a rubber stopper is provided for the electric wire of each connecting terminal inserted into the connection-terminal holding chamber (hereinafter also called "cavity") of a connector housing.

When a multi-polar connector is used, however, the presence of an unused connecting terminal allows water to penetrate into a free cavity through its terminal receiving hole. Consequently, a waterproofing rubber stopper 3 is inserted into the terminal receiving hole of a free cavity 2 as shown in FIG. 1, whereby the free cavity 2 is hermetically sealed in a liquid-tight fashion to prevent moisture from penetrating into a connector housing 1.

The conventional waterproofing rubber stopper 3 used in the waterproof connector like this has generally been formed by molding a soft rubber material into a columnar-shape. However, there is the possibility that the waterproofing rubber stopper 3 falls out of the connector housing 1 when the internal pressure rises at the time of fitting the connecter in, for example, because the waterproofing rubber stopper 3 is normally formed soft so as to increase the adhesive properties of the inside wall surface of the terminal receiving hole of the free cavity 2.

As disclosed in Japanese Utility Model Unexamined Publication No. Hei. 2-7874, a blank plug (waterproofing rubber stopper) for a waterproof connector is consequently formed by covering the periphery of a core material molded from a hard material with a soft sealing material having a wavy surface in cross section in order to secure waterproofness and to make the blank plug hardly come off a terminal receiving hole.

Even in the case where the blank plug is used for a waterproof connector as disclosed in the Japanese Utility Model Unexamined Publication No. Hei. 2-7874, the adhesive properties of the inside wall surface of the terminal receiving hole of the free cavity 2 are insufficient and when the internal pressure rises at the time of fitting the connector in, there is still the possibility that the blank plug displaces backward in the free cavity 2, thus ruining sealing performance or causing the blank plug to slip off the free cavity 2.

SUMMARY OF THE INVENTION

An object of the present invention intended to solve the foregoing problems is to provide such an improved rubber stopper for a waterproof connector as is quite simple in structure, capable of ensuring that the terminal holding chamber of a connector housing is hermetically sealed, and is prevented from coming out.

In order to accomplish the object above, a rubber stopper, according to the present invention, for a waterproof connector to be inserted into a terminal receiving hole of a waterproof connector housing so as to hermetically seal a terminal holding chamber, comprises:

a substantially columnar body portion; and a sealing protrusion radially protruded around the body portion and being capable of adhering to the inside wall surface of the terminal receiving hole, wherein the sealing protrusion includes an annular portion which is protruded along a circumferential line contained in the outer peripheral face of the body portion, and a thick-wall portion which is thicker than the annular portion in the axial direction.

In the above-mentioned rubber stopper for a waterproof connector, a plurality of the sealing protrusions may be disposed at predetermined intervals in the circumferential direction; and the thick-wall portions provided for the respective adjacent sealing protrusions are preferably arranged so that the thick-wall portions are positionally shifted from each other in the axial direction of the axis, to thereby disposing the thick wall portions in a staggered manner.

With the arrangement above, since the sealing protrusion adhering to the inside wall surface of the terminal receiving hole has thick-wall portions, a sealing area where the sealing protrusion adheres to the inside wall surface of the terminal receiving hole is increasable in comparison with a case where the sealing protrusion has no the thick-wall portions. Thus, the adhesion of the sealing protrusion to the inside wall surface of the terminal receiving hole is improvable. Moreover, the adhesion of the sealing protrusion to the inside wall surface of the terminal receiving hole is also improvable without increasing the length of the rubber stopper in the axial direction by providing the thick-wall portions for the respective adjoining sealing protrusions so that the thick-wall portions are positionally shifted from each other in the circumferential direction of the axis.

In order to accomplish the object above, further, a rubber stopper, according to a second aspect of the present invention, for a waterproof connector to be inserted into a terminal receiving hole of a waterproof connector housing so as to hermetically seal a terminal holding chamber, comprising:

a substantially columnar body portion and an annular sealing protrusion radially protruded around the body portion and being capable of adhering to the inside wall surface of the terminal receiving hole, wherein the annular sealing protrusion comprises an a tilted portion which is extended in such a manner as to tilt with respect to a circumferential line on the outer peripheral face of the body portion.

In the above-mentioned rubber stopper for a waterproof connector, the annular sealing protrusion may be in the form of a zigzag shape.

In addition, in the above-mentioned rubber stopper for a waterproof connector, the substantially columnar body portion may comprise a plurality of the annular sealing protrusions which are arranged in parallel with each other.

With the arrangement above, since the sealing protrusion comprising an annular portion having a tilted portion which is protruded in such a manner as to tilt with respect to a circumferential line on the outer peripheral face of the body portion, the whole length of the sealing protrusion is increasable in comparison with a case where the sealing protrusion is extended in a direction perpendicular to the circumferential line. Therefore, the sealing area where the sealing protrusion adheres to the inside wall surface of the terminal receiving hole is increasable and the adhesion of the sealing protrusion to the inside wall surface of the terminal receiving hole is improvable.

DESCRIPTION OF THE PREFERRED EMBODIMENTS

Referring to the accompanying drawings, there is subsequently give a description of a first embodiment of the present invention.

Figure 1:
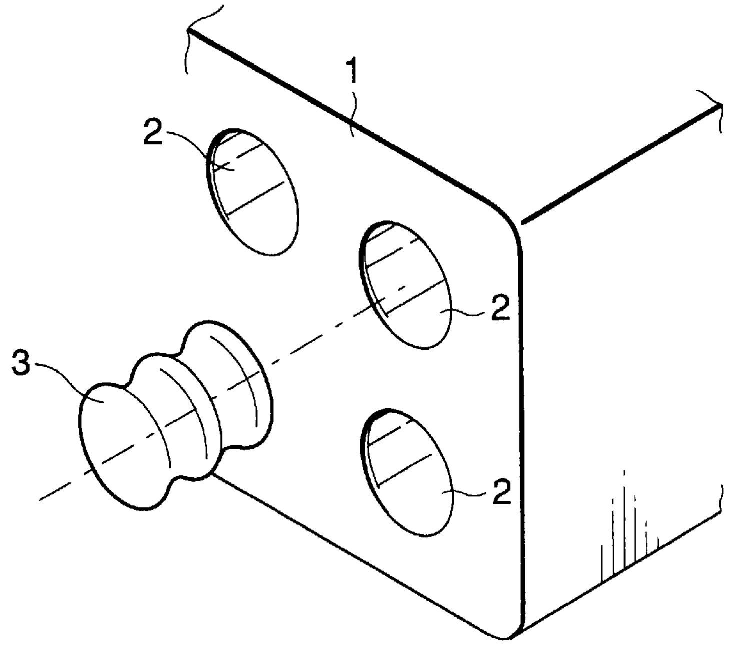
FIG. 1 is a partial perspective view showing a conventional rubber stopper for a waterproof connector and a free cavity of a connector housing.
Figure 2:
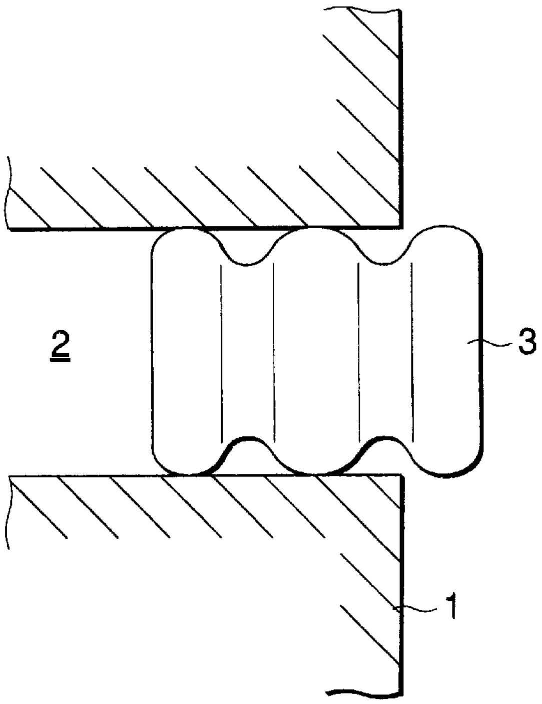
FIG. 2 is a partial sectional side view showing problems arising from the conventional waterproofing rubber stopper.
Figure 3:
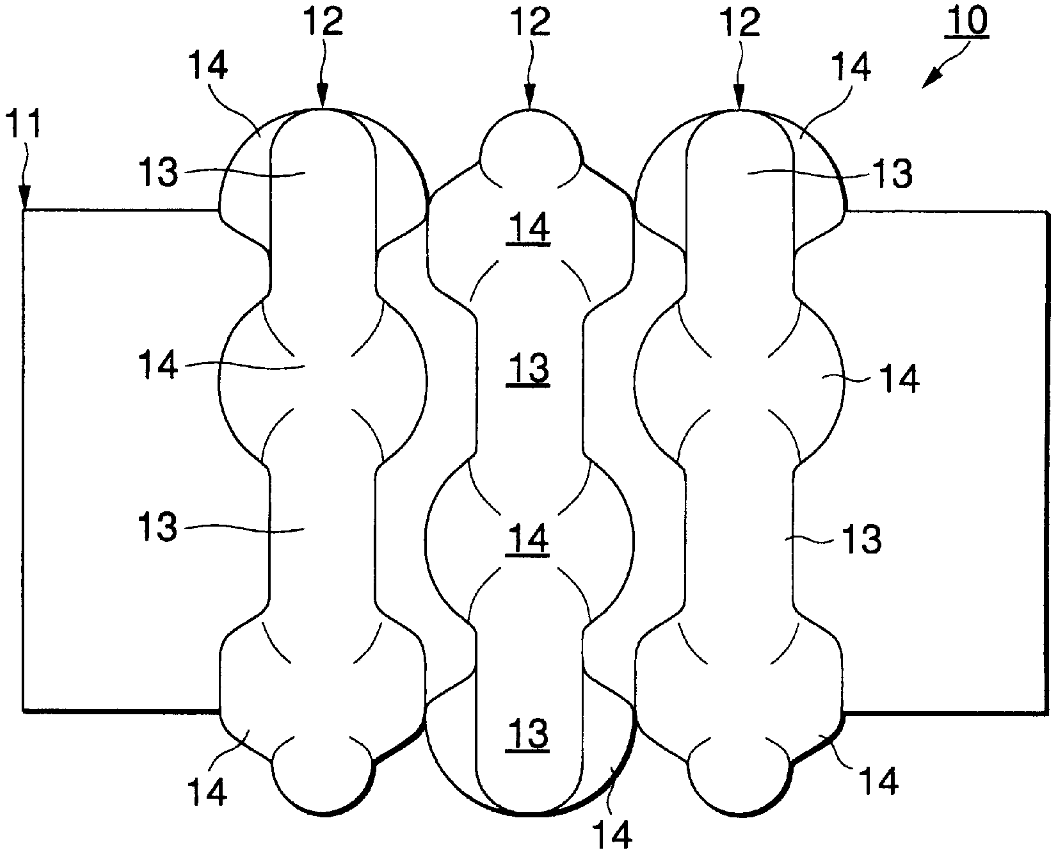
FIG. 3 is an overall side view of a rubber stopper for a waterproof connector as a first embodiment of the present invention.
Figure 4:
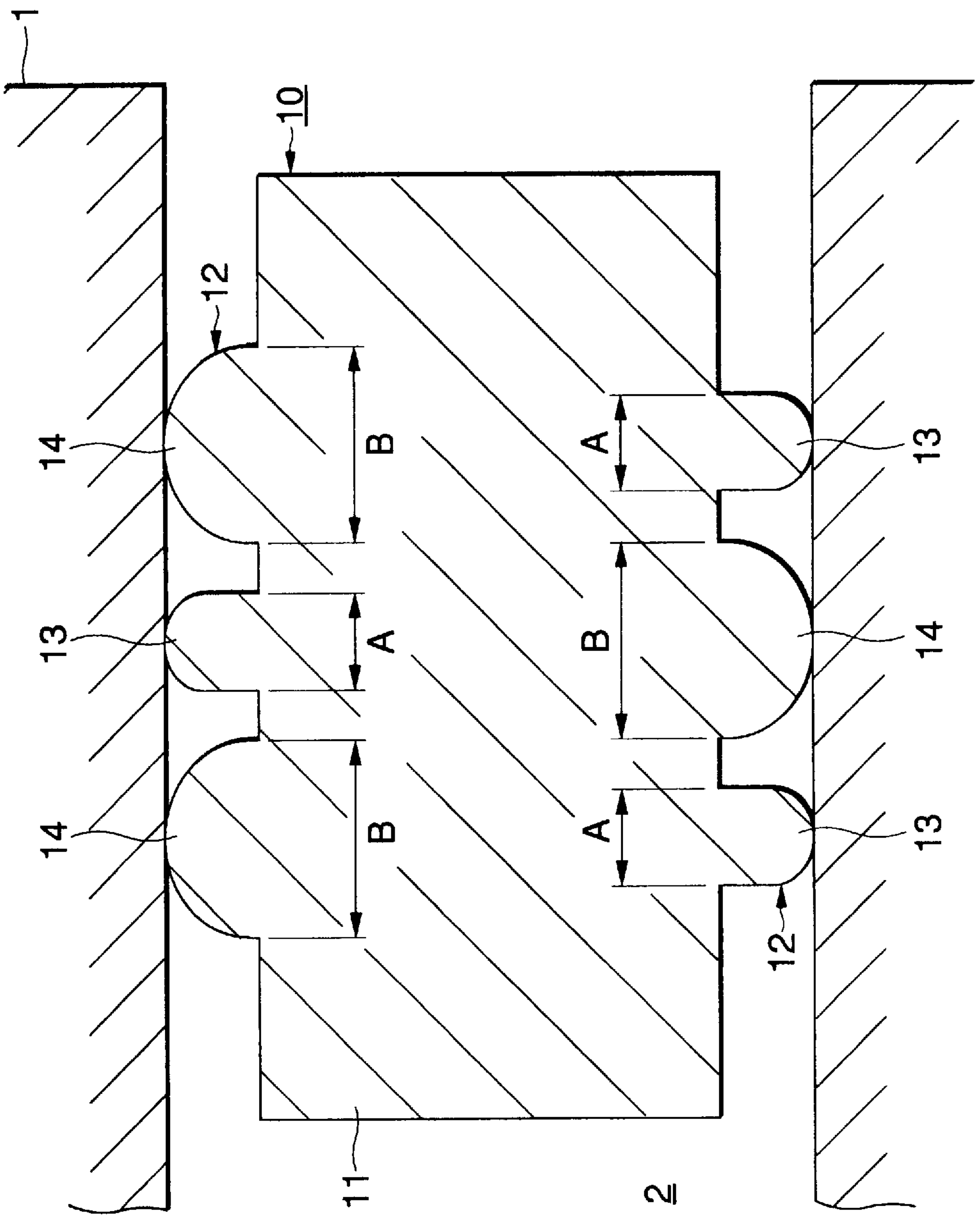
FIG. 4 is a partial vertical sectional view of a state in which the waterproofing rubber stopper shown in FIG. 3 has been inserted into the terminal receiving hole of a free cavity.
Figure 5:
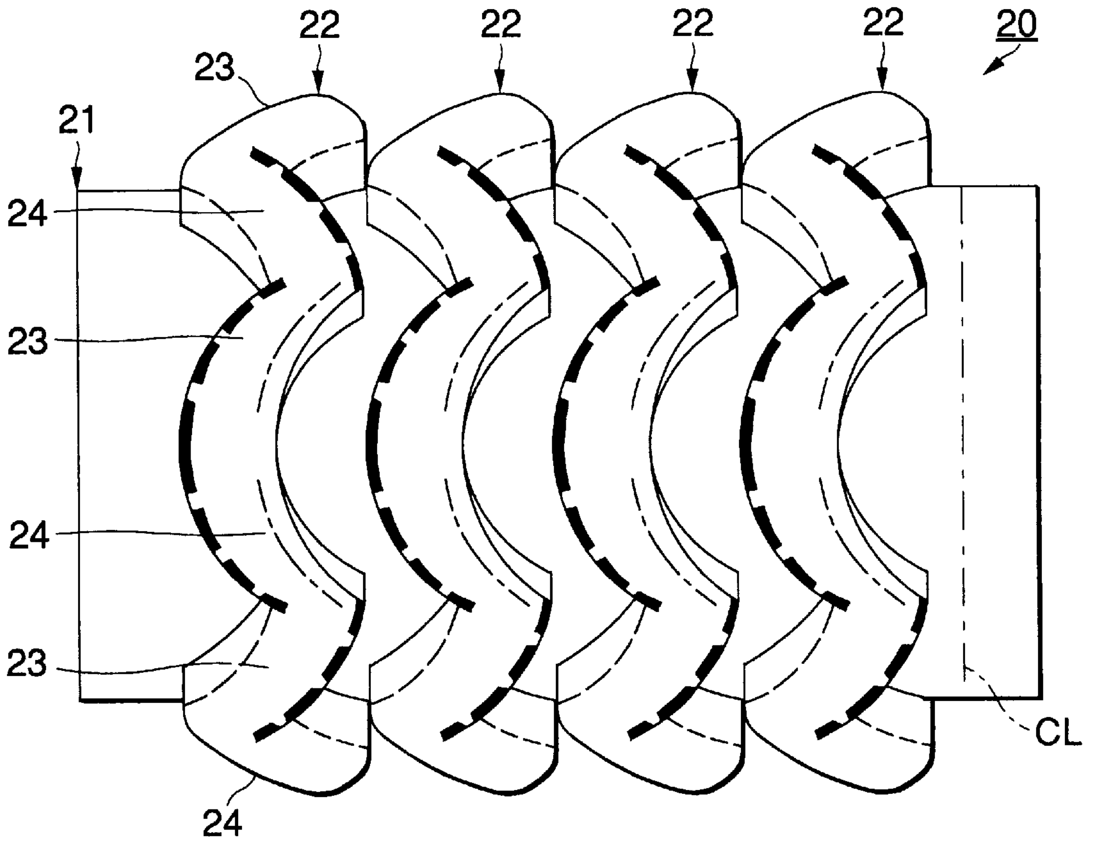
FIG. 5 is an overall side view of a rubber stopper for a waterproof connector as a second embodiment of the present invention.
Figure 6:
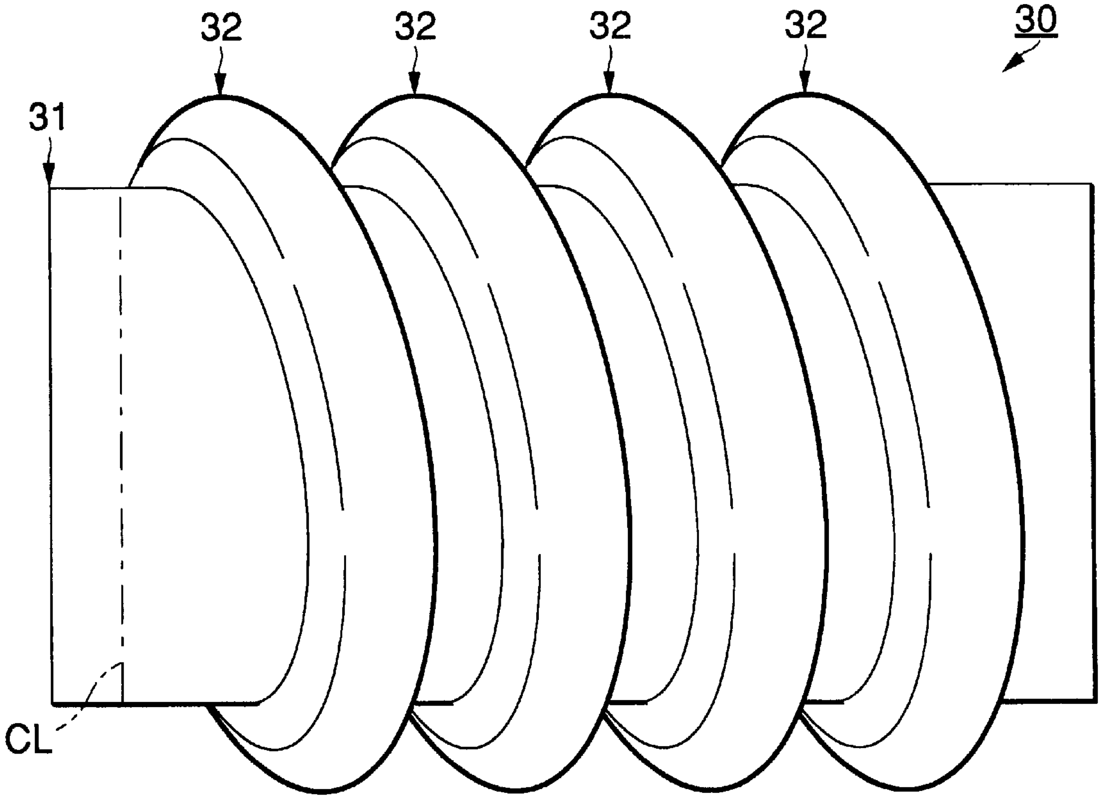
FIG. 6 is an overall side view of a rubber stopper for a waterproof connector as a third embodiment of the present invention.

FIG. 3 is an overall side view of a rubber stopper for a waterproof connector as a first embodiment of the present invention; FIG. 4 a partial vertical sectional view of a state in which the waterproofing rubber stopper shown in FIG. 3 has been inserted into the terminal receiving hole of a free cavity; FIG. 5 is an overall side view of a rubber stopper for a waterproof connector as a second embodiment of the present invention; and FIG. 6 is an overall side view of a rubber stopper for a waterproof connector as a third embodiment of the present invention.

A rubber stopper 10 for a waterproof connector according to the first embodiment of the invention as shown in FIGS. 3–4 is inserted into the terminal receiving hole of a free cavity 2 of a connector housing 1 for connecting electric wires in order to hermetically seal the free cavity 2 in a liquid-tight fashion. The rubber stopper 10 comprises a substantially columnar body portion 11 to be inserted into the terminal receiving hole of the free cavity 2, and sealing protrusions 12 capable of adhering to the inside wall surface 2*a*. According to this embodiment of the present invention, three sealing protrusions 12 in total are provided along the outer peripheral face of the body portion 11.

The sealing protrusion 12 has an annular portion 13 protruding along the outer peripheral face of the body portion 11 and a thick-wall portion 14 whose thickness in the axial direction is thicker than the annular portion 13. As shown in FIG. 3, the thick-wall portion 14 has a protruded height equal to that of the sealing protrusion 12 and is also in a hemispherical form which is smoothly continuous to the side face of the sealing protrusion 12, the thick-wall portions being protruded at equal intervals along the outer peripheral face of the annular portion 13. Further, the thick-wall portions 14 are arranged in a zigzag in such a manner that the adjoining sealing protrusions 12 are peripherally shifted in phase from each other.

When the rubber stopper 10 for a waterproof connector is inserted into the terminal receiving hole of the free cavity 2, the annular portions 13 having an axial thickness of A and the thick-wall portions 14 having an axial thickness of B are, as shown in FIG. 4, alternately disposed and brought into intimate contact with the inside wall surface of the terminal receiving hole of the free cavity 2.

More specifically, since the sealing protrusion 12 provided on the outer peripheral face of the columnar body portion 11 of the rubber stopper 10 for a waterproof connector according to the first embodiment of the invention has the thick-wall portion 14, it is possible to increase a sealing area where the sealing protrusion 12 is brought into intimate contact with the inside wall surface of the terminal receiving hole of the free cavity 2. Moreover, the sealing protrusion 12 is provided with not only the thick-wall portion 14 but also a deflecting space with respect to each of the adjacent sealing protrusions 12 to ensure that the rubber stopper 10 is smoothly insertable-into the terminal receiving hole of the free cavity 2.

While the rubber stopper 10 for a waterproof connector is kept smoothly insertable, it is ensured that the adhesion of the sealing protrusion 12 to the inside wall surface of the terminal receiving hole of the free cavity 2 is increased. Further, even though the pressure difference caused between the inside and outside of the connector housing 1 acts on the rubber stopper 10, the sealing performance of the rubber stopper 10 is not deteriorated and the rubber stopper 10 does not come off the free cavity 2 because the rubber stopper 10 is prevented from being displaced in the terminal receiving hole. Since the thick-wall portions 14 formed in the respective adjacent sealing protrusions 12 are disposed on the outer peripheral face of the body portion 11 in such a manner as to shift in phase from each other, the waterproofing effect greater than before is also achievable without making greater the size of the rubber stopper as a result of an increase in its axial length.

FIG. 5 is an overall side view of a rubber stopper for a waterproof connector as a second embodiment of the present invention.

A rubber stopper 20 for a waterproof connector according to a second embodiment of the invention comprises a columnar body portion 21 to be inserted into the terminal receiving hole of the free cavity 2, and-sealing protrusions 22 capable of adhering to the inside wall surface 2*a* of the terminal receiving hole. According to this embodiment of the present invention, four sealing protrusions 22 in total are provided along the outer peripheral face of the body portion 21.

The sealing protrusion 22 has a first and a second titled portion 23, 24 which are protruded in such a manner as to tilt in opposite directions with respect to a circumferential line CL on the outer peripheral face of the body portion 21, and wavy annular portions. Note that, the circumferential line CL is defined by a line contained in the outer peripheral face of the body portion 21 and extended about a center line of the columnar body portion 21.

In other words, since each sealing protrusion 22 adhering to the inside wall surface of the terminal receiving hole of the free cavity 2 of the rubber stopper 20 for a waterproof connector according to the second embodiment of the invention is extended in such a manner as to tilt with respect to the circumferential line on the outer peripheral face of the body portion 21, the whole length of the sealing protrusion 22 can be made greater than that of the sealing protrusion extended perpendicularly with respect to the circumferential line in the case of the conventional waterproofing rubber stopper.

Thus, a sealing area where the sealing protrusions 22 adhere to the inside wall surface of the-terminal receiving hole of the free cavity 2 can be increased and the adhesion of the sealing protrusions to the inside wall surface of the free cavity 2 can also be increased.

Therefore, the same effect as that of the rubber stopper 10 for a waterproof connector in the first embodiment of the invention is made achievable by the rubber stopper 20 for a waterproof connector in the second embodiment thereof.

FIG. 6 is an overall side view of a rubber stopper for a waterproof connector as a third embodiment of the present invention.

A rubber stopper 30 for a waterproof connector according to the third embodiment of the invention comprises a columnar body portion 31 to be inserted into the terminal receiving hole of the free cavity 2, and four sealing protrusions 32 in total protruding from the outer peripheral face of the body portion 31. The sealing protrusions 32 form annular portions protruded in such a manner as to tilt in the same direction with respect to the circumferential line of the body portion 31 and extended in parallel to each other.

In other words, each sealing protrusion 32 adhering to the inside wall surface of the terminal receiving hole of the free cavity 2 of the rubber stopper 30 for a waterproof connector like the rubber stopper 20 for a waterproof connector according to the second embodiment of the invention is extended in such a manner as to tilt with respect to the circumferential line on the outer peripheral face of the body portion 31, the whole length of the sealing protrusion 32 can be made greater than that of the sealing protrusion extended perpendicularly with respect to the circumferential line in the case of the conventional waterproofing rubber stopper.

Therefore, the same effect as that of the rubber stopper 20 for a waterproof connector in the second embodiment of the invention is made achievable by the rubber stopper 30 for a waterproof connector in the third embodiment thereof.

Incidentally, the rubber stoppers for waterproof connectors according to the present invention are not limited to those described in the above-described embodiments thereof but may be modified in various manners. For example, a sealing protrusion to be provided on the outer peripheral face of a body portion may be in any shape unless it is protruded in such a manner as to be extended perpendicularly in parallel with respect to the circumferential line on the outer peripheral face of the body portion.

As is obvious from the above description, the rubber stoppers for waterproof connectors according to the present invention can increase the sealing area where the sealing protrusion adheres to the inside wall surface of the terminal receiving hole while it is ensured that the rubber stopper is smoothly inserted into the terminal receiving hole, so that the adhesion of the sealing protrusion to the inside wall surface of the terminal receiving hole is improvable.

Consequently, even though the pressure difference caused between the inside and outside of the connector housing 1 of the rubber stopper according to the present invention acts on the rubber stopper 10, the sealing performance of the rubber stopper 10 is not deteriorated and the rubber stopper 10 does not come off the free cavity 2.

Therefore, it is possible to provide such an improved rubber stopper for a waterproof connector as is quite simple in structure, capable of ensuring that the terminal holding chamber of a connector housing is hermetically sealed and is prevented from coming out.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rubber stopper for a waterproof connector to be inserted into a terminal receiving hole of a waterproof connector housing so as to hermetically seal a terminal holding chamber, comprising:

a substantially columnar body portion having a central axis; and a sealing protrusion radially protruded around said body portion and being capable of adhering to the inside wall surface of said terminal receiving hole, wherein said sealing protrusion includes an annular portion which is protruded along a circumferential line contained in the outer peripheral face of said body portion, and circumferentially spaced thick-wall portions, each of which is thicker than said annular portion in the direction of the central axis of said body portion.

2. The rubber stopper for a waterproof connector according to claim 1, wherein a plurality of said sealing protrusions are disposed at predetermined intervals in the axial direction; and said thick-wall portions of respective adjacent sealing protrusions are arranged so that said thick-wall portions are positionally shifted from each other in the axial direction of the axis, thereby disposing said thick wall portions in a staggered manner.

3. A rubber stopper for a waterproof connector to be inserted into a terminal receiving hole of a waterproof connector housing so as to hermetically seal a terminal holding chamber, comprising:

a substantially columnar body portion having a central axis and an annular sealing protrusion radially protruded around said body portion and being capable of adhering to the inside wall surface of said terminal receiving hole, wherein said annular sealing protrusion comprises first and second tilted portions which are extended in such a manner as to tilt in opposite directions from each other with respect to a circumferential line on the outer peripheral face of said body portion.

4. The rubber stopper for a waterproof connector according to claim 3, wherein said annular sealing protrusion is in the form of a zigzag shape.

5. The rubber stopper for a waterproof connector according to claim 3, wherein said substantially columnar body portion comprises a plurality of said annular sealing protrusions which are arranged in parallel with each other.

* * * * *